United States Patent
Kim et al.

(10) Patent No.: US 7,974,313 B2
(45) Date of Patent: Jul. 5, 2011

(54) SYSTEM FOR INTERMEDIATING A/V STREAM BETWEEN DATA NETWORK AND IEEE 1394 NETWORK AND METHOD THEREOF

(75) Inventors: Jun-hyeong Kim, Anyang-si (KR); Moon-jeong Choi, Seoul (KR); Sang-do Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 904 days.

(21) Appl. No.: 11/600,222

(22) Filed: Nov. 16, 2006

(65) Prior Publication Data

US 2007/0183453 A1  Aug. 9, 2007

(30) Foreign Application Priority Data

Feb. 7, 2006 (KR) .................. 10-2006-0011671

(51) Int. Cl.
*H04J 1/00* (2006.01)
*H04N 7/16* (2011.01)
*G06F 15/16* (2006.01)

(52) U.S. Cl. ............... 370/486; 725/146; 709/203

(58) Field of Classification Search ............ 370/352, 370/419, 420, 400, 485, 486, 487; 84/605; 375/221, 242, 146, 147, 219, 240; 709/203, 709/208, 226, 232; 348/14.13
See application file for complete search history.

(56) References Cited

U.S. PATENT DOCUMENTS

| | | | | |
|---|---|---|---|---|
| 6,101,215 A * | 8/2000 | Takeda et al. | ............. | 375/221 |
| 6,271,455 B1 * | 8/2001 | Ishigaki et al. | ............. | 84/605 |
| 6,463,445 B1 * | 10/2002 | Suzuki et al. | ............. | 1/1 |
| 6,618,396 B1 * | 9/2003 | Kondo et al. | ............. | 370/474 |
| 7,567,575 B2 * | 7/2009 | Chen et al. | ............. | 370/401 |
| 2005/0265395 A1 * | 12/2005 | Kim et al. | ............. | 370/485 |
| 2006/0174304 A1 * | 8/2006 | Kim et al. | ............. | 725/116 |
| 2007/0169115 A1 * | 7/2007 | Ko et al. | ............. | 717/174 |

* cited by examiner

*Primary Examiner* — Hanh Nguyen
(74) *Attorney, Agent, or Firm* — NSIP Law (57) ABSTRACT

A system and method for intermediating an audio/video (A/V) stream between a data network and an IEEE 1394 network are provided. In an exemplary embodiment, an A/V stream of an IP network is provided to a device connected to the IEEE 1394 network in real time, or the A/V stream of the IP network is once stored and then is provided to the device connected to the IEEE 1394 network when a viewer desires to view the A/V stream. The A/V stream can be provided to the viewer irrespective of the format parser, codec, transmission protocol, and transmission control protocol, required for the transrecorder's reception of the A/V stream from the media server or for the transrecorder's transmission of the A/V stream to the display device. Also, diverse A/V streams provided from the server of the data network can be stored, and then can be provided to the viewer through the display device whenever the display device connected to the IEEE 1394 network requests the A/V stream.

30 Claims, 4 Drawing Sheets

SYSTEM FOR INTERMEDIATING A/V STREAM BETWEEN DATA NETWORK AND IEEE 1394 NETWORK AND METHOD THEREOF

CROSS-REFERENCE TO RELATED APPLICATIONS

This application claims the benefit under 35 U.S.C. §119 of Korean Patent Application No. 10-2006-011671, filed Feb. 7, 2006, in the Korean Intellectual Property Office, the entire disclosure of which is hereby incorporated by reference.

BACKGROUND OF THE INVENTION

1. Field of the Invention

The present invention relates to an audio/video stream intermediating between different kinds of networks. More particularly, the present invention relates to a system and method for intermediating an audio/video (A/V) stream between a data network and an IEEE 1394 network in which an A/V stream of an IP network is provided to a device connected to the IEEE 1394 network in real time, or the A/V stream of the IP network is stored and provided to the device connected to the IEEE 1394 network when a viewer desires to view the A/V stream.

2. Description of the Related Art

Generally, an A/V network is classified into an IP-based data network and an IEEE 1394 network, which is a non-IP network. A device that uses an IP-based data network may be a computer. A device that uses the IEEE1394 network may be a digital television receiver or a digital camcorder.

The IEEE 1394 network has a data transfer rate of 100 Mbps, 200 Mbps, and 400 Mbps, and guarantees a quality of service (QoS). However, file formats supported in the IEEE 1394 network are limited. A representative file format supported in the IEEE 1394 network is an MPEG-2 transport stream. By contrast, the IP-based data network has the disadvantage that it has a data transfer rate lower than that of the IEEE 1394 network, and cannot guarantee the QoS. The data network, however, has the advantage that it can support diverse kinds of transmission stream formats and codecs, transmission protocols, and transmission control protocols.

Recently, with the trend of integrating a data network and an IEEE 1394 network, the Applicant has filed Korean Patent Application No. 2005-0008614 entitled "A/V steam intermediating system that intermediates an A/V stream of a data network to an IEEE 1394 network and method thereof" the entire disclosure of which is hereby incorporated by reference.

According to this disclosed system and method, however, only an MPEG-2 transport stream can be supported in the IEEE 1394 network. In the case of providing a broadcasting stream from a media server connected to an IP-based data network to a display device connected to the IEEE 1394 network, the broadcasting stream requires display in real time even in the IEEE 1394 network, and thus a viewer cannot view the broadcasting stream through a device connected to the IEEE 1394 network at a desired time other than in real time. In addition, different user interfaces must be used to control the media server and transcoder, and this causes inconvenience to users.

Accordingly, there is a need for an improved system and method for intermediating an A/V stream between a data network and an IEEE 1394 network.

SUMMARY OF THE INVENTION

Exemplary embodiments of the present invention have been developed in order to address the above and other problems associated with the conventional arrangement and provide the objectives listed below. An exemplary aspect of embodiments of the present invention is to provide a system for intermediating an audio/video (A/V) stream between a data network and an IEEE 1394 network and a method thereof, which can support diverse A/V stream formats in addition to an MPEG-2 transport stream even in the IEEE 1394 network when intermediating an A/V stream of an IP network to the IEEE 1394 network, and which can store the A/V stream of the IP network and provide the stored A/V stream to a device connected to the IEEE 1394 network when a viewer desires to view the A/V stream.

The foregoing and other objects and advantages are substantially realized by providing a system for intermediating an audio/video (A/V) stream, according to an exemplary embodiment of the present invention, which comprises a media server for providing an A/V stream and a mobile code required for reception and decoding of the A/V stream through a data network, a codec server for providing a mobile code required for transmission and encoding of the A/V stream, and a transrecorder for receiving the A/V stream and for converting the A/V stream from the media server into an A/V stream of a specified format that can be received and played by a display device connected through an IEEE 1394 network, on the basis of a specified mobile code provided from the media server and the codec server, the transrecorder transmitting the A/V stream to the display device in real time, or storing the A/V stream and then transmitting the stored A/V stream to the display device when a viewer desires to view the A/V stream.

The media server, the codec server, and the transrecorder may be connected through an IP network, and the transrecorder and the display device may be connected through the IEEE 1394 network.

The media server may comprise a storage unit for storing an A/V file and the mobile code, a mobile code providing unit for providing specified resources in the form of a mobile code, in response to a request for the specified resources that is received from the transrecorder, an A/V stream providing unit for converting the A/V file stored in the storage unit into the A/V stream and for providing the converted A/V stream to the transrecorder if the transrecorder requests transmission of the A/V stream, and an IP network interface unit for performing IP network communication with the transrecorder.

The mobile code may comprise a format parser, a codec, a transmission protocol, and a transmission control protocol.

The mobile code providing unit may provide a format parser, a codec, a transmission protocol, and a transmission control protocol, which the media server holds, to the transrecorder when the request for the resources is received from the transrecorder.

The transrecorder may comprise a user interface (UI) providing unit for providing a specified user interface to the display device if the display device requests the user interface, a media storage unit for storing the A/V stream, an A/V stream request processing unit for providing the A/V stream, which corresponds to a request for the A/V stream received from the display device, to the display device in real time, or reading the A/V stream corresponding to the request from the media storage unit and providing the read A/V stream to the display device, if the transrecorder is reconstructed after the request for the A/V stream received from the display device is processed, an A/V stream receiving unit for receiving the A/V stream, an A/V stream conversion unit for transcoding the A/V stream into the A/V stream of the specified format supported by the display device, and an A/V stream transmission unit for transmitting the transcoded A/V stream of the specified format to the display device.

A system for intermediating an A/V stream according to an exemplary embodiment of the present invention may further comprise a mobile code storage unit for storing the mobile code received from the media server and the codec server, and a mobile code execution unit for executing the mobile code received from the media server and the codec server.

The A/V stream request processing unit may provide a list of a format parser, a codec, a transmission protocol, and a transmission control protocol, which can be supported by the transrecorder, to the media server, may receive a list of a format parser, a codec, a transmission protocol, and a transmission control protocol, which are required for reception and decoding of the A/V stream, from the media server, may check whether the A/V stream request processing unit itself holds the format parser, the codec, the transmission protocol, and the transmission control protocol, and may request the format parser, the codec, the transmission protocol, and the transmission control protocol, which are not held by the A/V stream request processing unit itself, from the media server.

The A/V stream request processing unit may request resources including a format parser, a codec, a transmission protocol, and a transmission control protocol, which are required to encode and transmit the A/V stream to the display device, to the codec server.

The transrecorder may further comprise an IEEE 1394 network interface unit for performing an interface with the display device, and an IP network interface unit for performing an interface with the media server and the codec server.

The transrecorder may further comprise a transrecorder reconstruction unit for reconstructing the transrecorder on the basis of specified resources provided by the media server and the codec server.

The A/V stream conversion unit may convert the A/V stream transmitted from the media server into raw data by decoding the A/V stream on the basis of a specified codec supported by the media server, store the raw data in a buffer, and then encode the raw data to an A/V stream of a specified format supported by the display device, on the basis of the codec provided from the codec server.

An exemplary transrecorder for receiving an A/V stream from a media server connected to a data network and for transmitting the received A/V stream to a display device connected to an IEEE 1394 network, may comprise a media storage unit for storing the A/V stream, an A/V stream request processing unit for providing the A/V stream, which corresponds to a request for the A/V stream received from the display device, to the display device in real time, or reading the A/V stream corresponding to the request from the media storage unit and providing the read A/V stream to the display device, if the transrecorder is reconstructed after receiving the request for the A/V stream from the display device, an A/V stream receiving unit for receiving the A/V stream, an A/V stream conversion unit for transcoding the A/V stream into an A/V stream of a specified format that is supported by the display device, and an A/V stream transmission unit for transmitting the transcoded A/V stream of the specified format to the display device.

The transrecorder according to an exemplary embodiment of the present invention may further comprise a user interface (UI) providing unit for providing a specified user interface to the display device if the display device requests the user interface, a mobile code storage unit for storing the mobile code received from the media server and the codec server, and a mobile code execution unit for executing the mobile code received from the media server and the codec server.

The A/V stream conversion unit may convert the A/V stream transmitted from the media server into raw data by decoding the A/V stream on the basis of a specified codec supported by the media server, store the raw data in a buffer, and then encode the raw data to an A/V stream of a specified format supported by the display device, on the basis of a specified encoding codec provided from the codec server.

The mobile code may comprise a format parser, a codec, a transmission protocol, and a transmission control protocol.

The transrecorder may further comprise an IEEE 1394 network interface unit for performing an interface with the display device, and an IP network interface unit for performing an interface with the media server and the codec server.

In still another exemplary embodiment of the present invention, there is provided a method of intermediating an audio/video (A/V) stream, which comprises receiving resources required for reception and decoding of the A/V stream from a media server of a data network, receiving resources required for encoding and transmission of the A/V stream from a codec server of the data network, receiving the A/V stream from the media server, transcoding the A/V stream on the basis of the resources received from the media server and the codec server, and then transmitting the transcoded A/V stream to a device connected to an IEEE 1394 network or storing the transcoded A/V stream in a storage unit, and transmitting the A/V stream stored in the storage unit to the device connected to the IEEE 1394 network if the device connected to the IEEE 1394 network requests the A/V stream.

The receiving of the resources required for reception and decoding of the A/V stream from a media server of a data network, and the receiving of the resources required for encoding and transmission of the A/V stream from a codec server of the data network may comprise receiving the required resources in the form of a mobile code.

The mobile code may comprise a format parser, a codec, a transmission protocol, and a transmission control protocol.

The device may be reconstructed on the basis of the resources provided from the media server and the resources provided from the codec server.

BRIEF DESCRIPTION OF THE DRAWINGS

The above aspects and features of embodiments of the present invention will become more apparent by describing certain exemplary embodiments of the present invention with reference to the accompanying drawings, in which.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Exemplary embodiments of the present invention will now be described in detail with reference to the annexed drawings.

Figure 1:
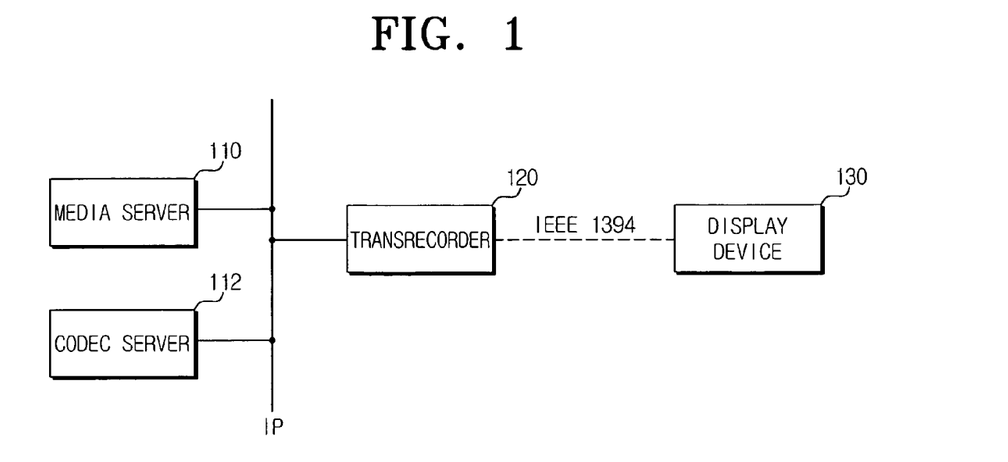
FIG. 1 is a view illustrating a system for intermediating an A/V stream of a data network to an IEEE 1394 network according to an exemplary embodiment of the present invention.

FIG. 1 is a view illustrating a system for intermediating an A/V stream between a data network and an IEEE 1394 network according to an exemplary embodiment of the present invention.

As illustrated in FIG. 1, a system for intermediating an A/V stream according to an exemplary embodiment of the present invention comprises a media server 110, a codec server 112, a transrecorder 120, and a display device 130.

Here, the media server 110, the codec server 112, and the transrecorder 120 are connected to an IP network that is a data network, and the transrecorder 120 and the display device 130 are connected to an IEEE 1394 network. In an exemplary embodiment of the present invention, a physical layer and a transmission layer of the IEEE 1394 network are connected using IEEE 1394 services, protocols and formats. A physical layer of the data network is connected by an Ethernet, a wireless LA/V and the like, and a transmission layer of the data network uses Internet Protocol (IP).

The media server 110 is a device that provides an A/V stream. Although FIG. 1 illustrates one media server, one or more media servers may be provided.

If the transrecorder 120 requests resources required for reception and decoding of the A/V stream, the media server 110 provides a format parser, a codec, a transmission protocol, a transmission control protocol and the like for the requested A/V stream to the transrecorder 120. In an exemplary embodiment of the present invention, the format parser, codec, transmission protocol, transmission control protocol and the like for the A/V stream are transmitted in the form of a mobile code developed in a programming language such as Java. Also, an A/V stream provided by the media server 110 is converted into a transport stream, which can be received and played by the display device 130, through the transrecorder 120, irrespective of the kind of A/V stream.

The codec server 112 is connected to the IP network that is a data network, and the transrecorder 120 may receive the format parser, codec, transmission protocol, and transmission control protocol required for encoding and transmission of the A/V stream from the codec server 112.

The transrecorder 120 intermediates the A/V stream between the data network and the IEEE 1394 network. Also, the transrecorder 120 converts an A/V stream provided from the media server 110 into a transport stream that can be played by the display device 130, and provides the converted transport stream to the display device 130 through the IEEE 1394 network. In addition, if the display device 130 requests an A/V stream, the transrecorder 120, which may have stored the A/V steam provided from the media server 110 in a storage device, provides the stored A/V stream to the display device 130 through the IEEE 1394 network.

The display device 130 is connected to the transrecorder 120 through an IEEE 1394 network. The display device 130 requests a user interface (UI) for controlling the transrecorder from the transrecorder 120, and receives the requested UI. The display device 130 controls the transrecorder 120, retrieves the A/V stream, requests a playback of the retrieved A/V stream, or requests a storing of the retrieved A/V stream, using the provided UI.

Figure 2:
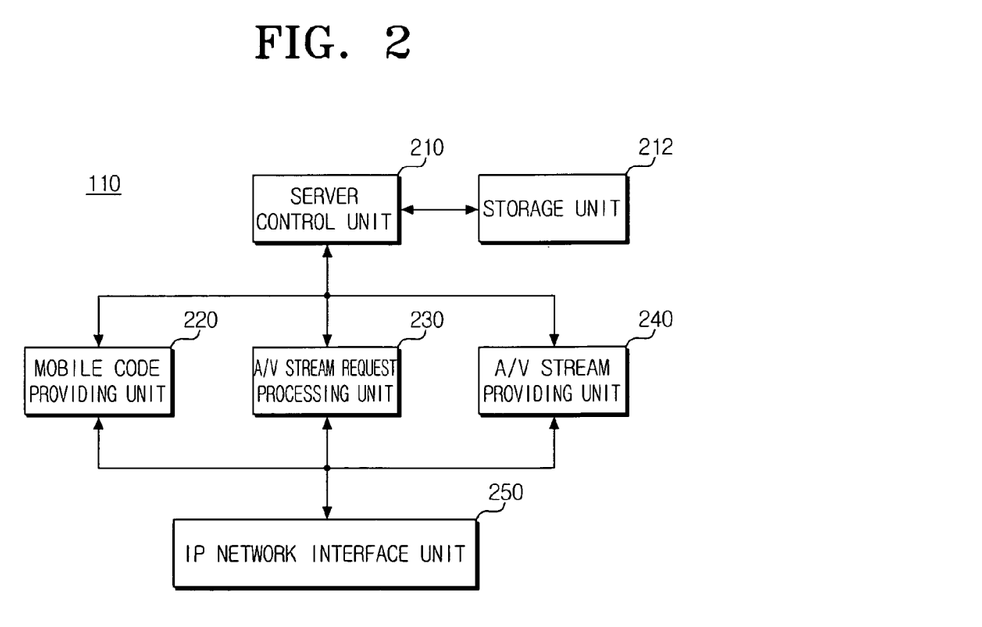
FIG. 2 is a block diagram illustrating the construction of a media server according to an exemplary embodiment of the present invention.

FIG. 2 is a block diagram illustrating the construction of a media server according to an exemplary embodiment of the present invention.

Referring to FIG. 2, an exemplary implementation of a media server 110 comprises a server control unit 210, a storage unit 212, a mobile code providing unit 220, an A/V stream request processing unit 230, an A/V stream providing unit 240, and an IP network interface unit 250.

The server control unit 210 performs overall control of the media server 110.

The storage unit 212 may store various kinds of A/V files, and may store the parser, codec, transmission protocol, transmission control protocol and the like of the A/V file format supported by the media server 110 in the form of a mobile code.

If the transrecorder 120 requests the mobile code, the mobile code providing unit 220 may read the requested mobile code from the storage unit 212, and provide the read mobile code to the transrecorder 120. In an exemplary embodiment, the mobile code comprises the format parser, codec, transmission protocol, and transmission control protocol using a Java language and on the like. The mobile code may also be downloaded or dynamically loaded, and may be executed by a mobile code execution unit of the transrecorder 120.

If the transrecorder 120 requests an A/V stream, the A/V stream request processing unit 230 negotiates with the transrecorder 120 for transmission and decoding of the A/V stream.

If the transrecorder 120 requests transmission of an A/V stream using an agreed transmission control protocol, the A/V stream providing unit 240 converts the A/V file stored in the storage unit 212 into an A/V stream and provides the A/V stream to the transrecorder 120.

The IP network interface unit 250 performs IP network communications with the transrecorder 120.

Figure 3:
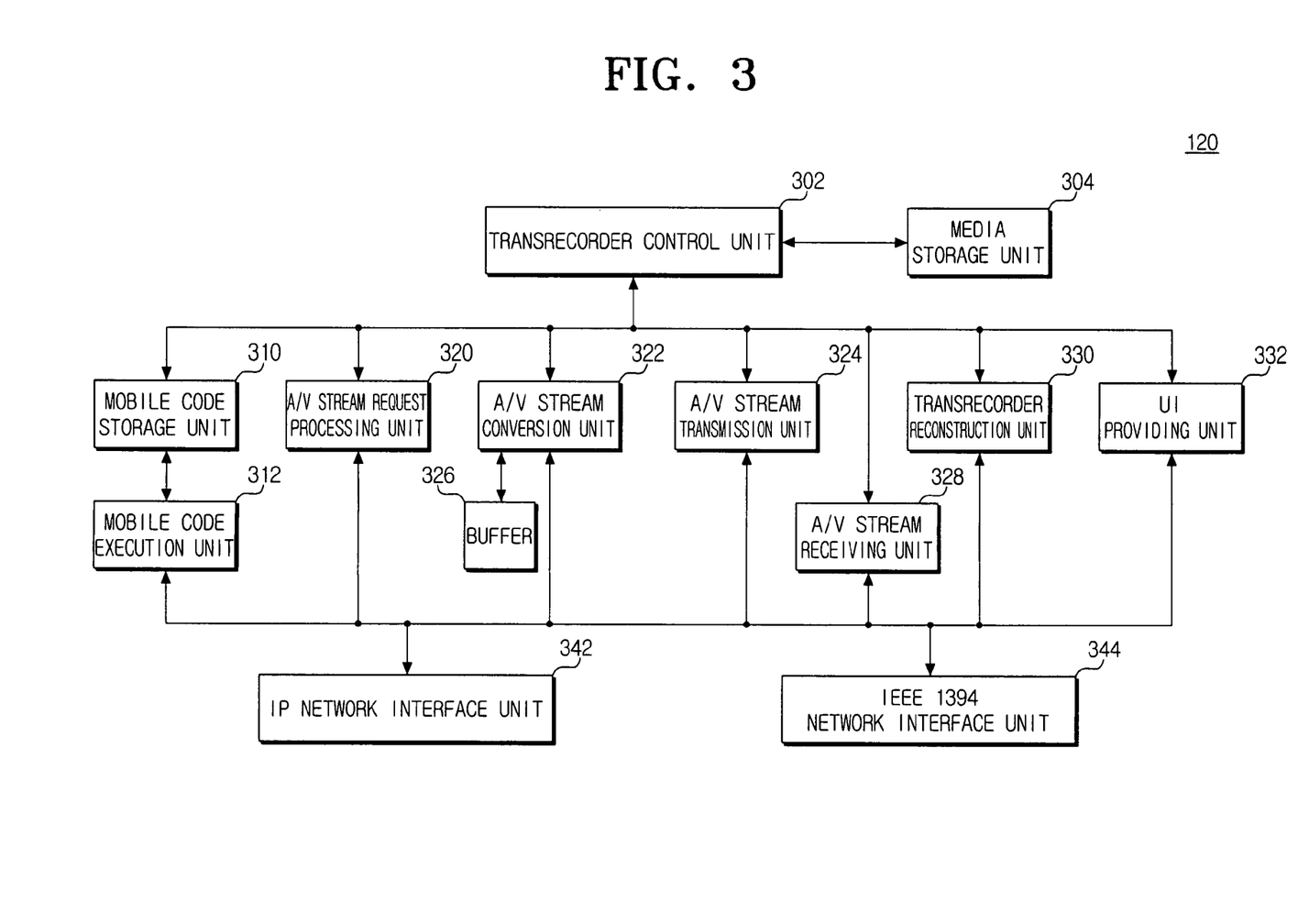
FIG. 3 is a block diagram illustrating the construction of a transrecorder according to an exemplary embodiment of the present invention.

FIG. 3 is a block diagram illustrating the construction of a transrecorder according to an exemplary embodiment of the present invention.

As illustrated in FIG. 3, the transrecorder 120 according to an exemplary embodiment of the present invention comprises a transrecorder control unit 302, a media storage unit 304, a mobile code storage unit 310, a mobile code execution unit 312, an A/V stream request processing unit 320, an A/V stream conversion unit 322, an A/V stream transmission unit 324, a buffer 326, an A/V stream receiving unit 328, a transrecorder reconstruction unit 330, a UI providing unit 332, an IP network interface unit 342, and an IEEE 1394 network interface unit 344.

The transrecorder control unit 302 controls overall operation of the transrecorder 120. The media storage unit 304 is a mass storage device for storing a plurality of A/V streams.

The mobile code storage unit 310 stores the mobile code received from the media server 110 and the codec server 112, in other words, the format parser, codec, transmission protocol, transmission control protocol and the like.

The mobile code execution unit 312 executes the mobile code received from the media server 110 and the codec server 112.

The A/V stream request processing unit 320 receives and processes a request of the display device 130 for an A/V stream, and then requests the A/V stream from the media server 110.

The A/V stream conversion unit 322 transcodes the A/V stream of the IP network received from the media server 110 into a stream format supported by the display device 130. For example, the A/V stream conversion unit 322 may convert by decoding the A/V stream of an MPEG-4 format received from the media server 110 into raw data, and temporarily store the raw data in the buffer 326. Thereafter, the A/V stream conversion unit 322 encodes the raw data stored in the buffer 326 into, for example, an MPEG-2 format or other format that is supported by the display device 130.

The A/V stream transmission unit 324 transmits the transcoded A/V stream to the display device 130 through the IEEE 1394 network interface unit 344.

The A/V stream receiving unit 328 receives the A/V stream of the IP network that is transmitted by the media server 110 in response to the transrecorder's request for the A/V stream.

The transrecorder reconstruction unit 330 receives the mobile code required for transcoding from the media server 110 and the codec server 112, and reconstructs or reconfigures the transrecorder 120 on the basis of the result of mobile code execution performed by the mobile code execution unit 312. As described above, the mobile code transmitted from the media server 110 and the codec server 112 comprises the format parser, codec, transmission protocol, and transmission control protocol.

The UI providing unit 332, if the display device 130 requests a UI to control the transrecorder 120, provides the UI to the display device 130 in response to the request. The UI provided from the UI providing unit 332 of the transrecorder 120 comprises a function required for the display device 130 to request the A/V streaming and other additional functions.

The IP network interface unit 342 performs communications with the media server 110 and the codec server 112. The IEEE 1394 network interface unit 344 performs communications with the display device 130.

Figure 4:
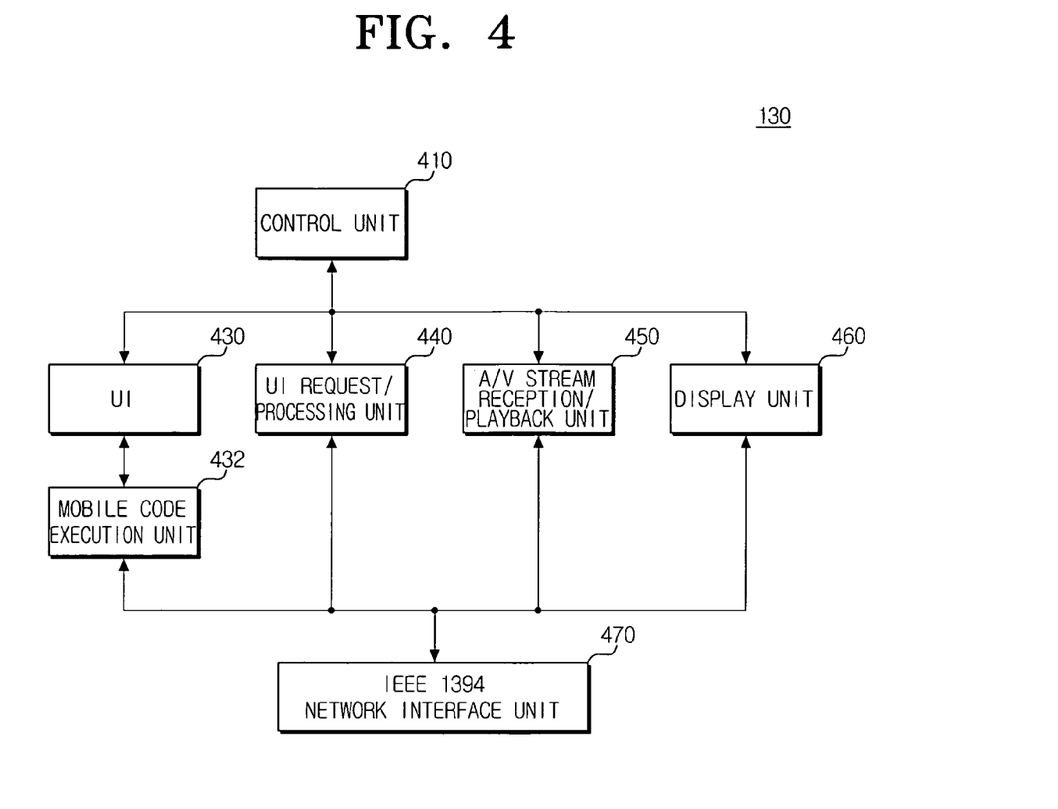
FIG. 4 is a block diagram illustrating the internal construction of a display device according to an exemplary embodiment of the present invention.

FIG. 4 is a block diagram illustrating the internal construction of a display device according to an exemplary embodiment of the present invention.

As illustrated in FIG. 4, an exemplary implementation of a display device 130 comprises a control unit 410, a UI unit 430, a mobile code execution unit 432, a UI request/processing unit 440, an A/V stream reception/playback unit 450, a display unit 460, and an IEEE 1394 network interface unit 470.

The control unit 410 controls overall operation of the display device 130.

The UI unit 430 comprises a UI obtained by executing the mobile code received from the transrecorder 120, and provides functions required to retrieve and request the A/V stream.

The UI request/processing unit 440 requests a UI required for requesting and execution of the A/V stream to the transrecorder 120, and executes the UI provided from the transrececorder 120 in response to the request on the mobile code execution unit 432.

The A/V stream reception/playback unit 450 receives the A/V stream transmitted from the transrecorder 120 through the IEEE 1394 network, and displays the received A/V stream on the display unit 460.

The IEEE 1394 network interface unit 470 performs network communications between the transrecorder 120 and the display device 130 through the IEEE 1394 network.

Figure 5:
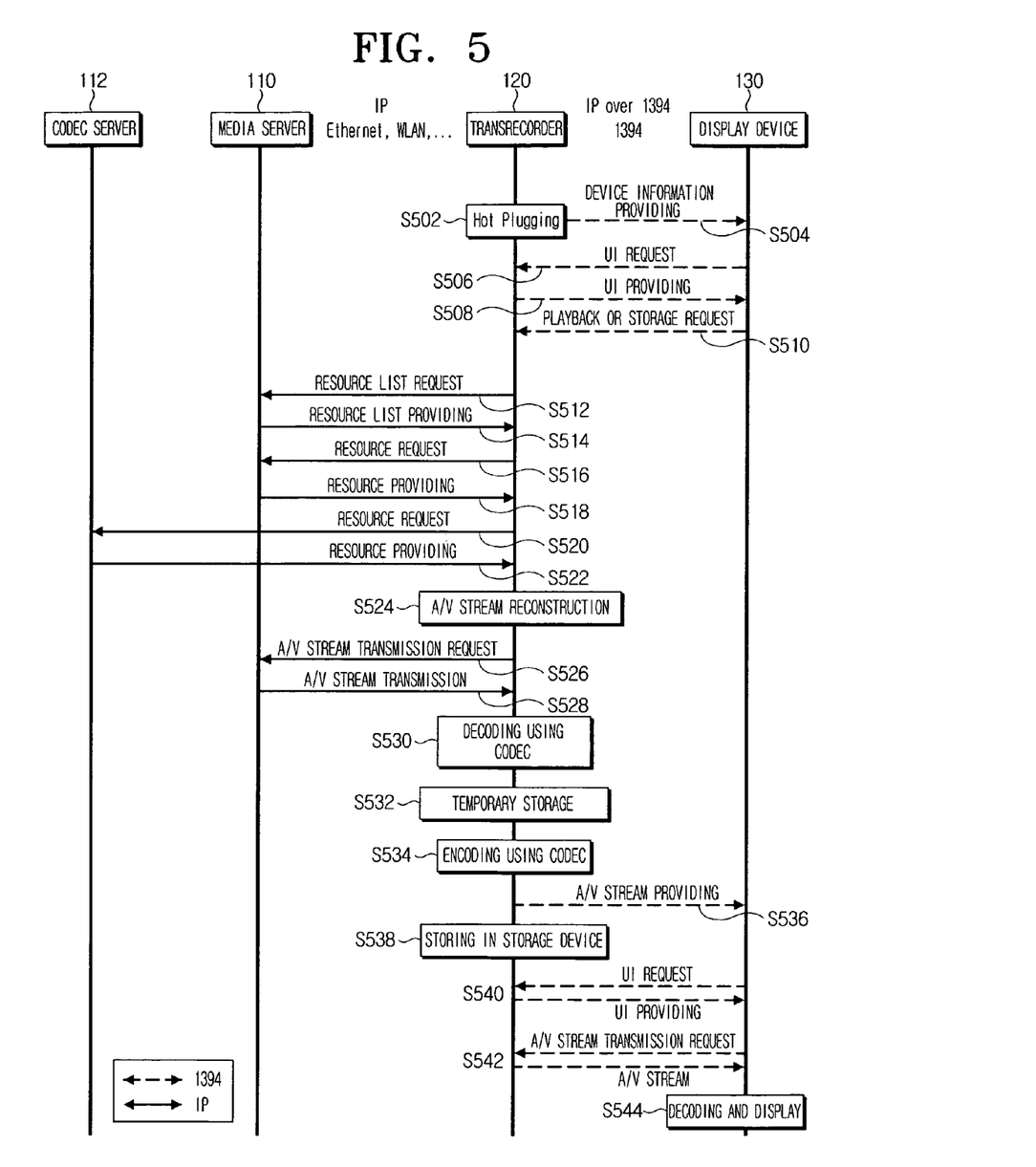
FIG. 5 is a flowchart illustrating a method of intermediating an A/V stream between a data network and an IEEE 1394 network according to an exemplary embodiment of the present invention.

FIG. 5 is a flowchart illustrating an exemplary method of intermediating an A/V stream between a data network and an IEEE 1394 network.

In an exemplary embodiment of the present invention, it is assumed that the A/V stream format, codec, transmission protocol, and transmission control protocol supported by the media server 110 are MP4, MPEG-4 codec, RTP, and RTSP, respectively.

Referring to FIGS. 2 to 5, when the transrecorder 120 and the display device 130 are connected through the IEEE 1394 network, hot plugging occurs (S502). At this time, device information, such as a 1394 network address, a service list, and others of the transrecorder 120, is transmitted from the transrecorder 120 to the display device 130 (S504).

The UI request/processing unit 440 of the display device 130 requests the transmission of a UI, which provides functions required to request A/V streaming from the media server 110, from the transrecorder 120 (S506). In response to this request by the display device 130, the UI providing unit 332 of the transrecorder 120 provides the UI to the display device 130 (S508). The user interface provided by the UI providing unit 332 of the transrecorder 120 comprises a function required to request and execute an A/V stream, a content list retrieving function, and other functions.

The transrecorder 120, in response to the display device's request for the UI, provides the UI in the form of a mobile code to the display device 130, in order to make it possible for a viewer of the display device 130 to retrieve the content list. If the UI is provided to the display device 130, the UI request/processing unit 440 of the display device 130 executes the UI through the mobile code execution unit 432 of the display device 130. In this case, the viewer selects desired content through the content list provided from the UI.

If desired content is selected by a user, the display device 130 requests the playback or storage of the selected content to the transrecorder 120 (S510). When requesting the A/V stream from the transrecorder 120, the display device 130 provides playable A/V stream type information and content information for playback to the transrecorder 120.

If the display device 130 requests an A/V stream, the A/V stream request processing unit 320 of the transrecorder 120 requests a list of resources required to receive and decode the A/V stream from the media server 110 (S512). In an exemplary embodiment, the transrecorder 120 provides information such as its own IP address, content to be requested, a list of A/V stream formats that can be supported by the transrecorder 120, a list of codecs, a list of transmission protocols, a list of transmission control protocols, and others, to the media server 110.

When the transrecorder 120 requests the list of resources required to receive and decode the A/V stream from the media server 110, the A/V stream request processing unit 230 of the media server 110 refers to the list of resources provided from the transrecorder 120 and transmits the list of resources required to receive and decode the A/V stream of the corresponding content to the transrecorder 120 (S514). In an exemplary embodiment, the response (S514) of the media server 110 comprises an IP address of the media server 110, content to be provided, format information of the A/V stream supported by the media server 110 (for example, MPEG4), codec information (for example, MPEG4), transmission protocol information (for example, RTP), transmission control protocol information (for example, RTSP) and the like.

The A/V stream request processing unit 320 of the transrecorder 120 checks whether it holds resources required to receive and decode the A/V stream provided by the media server 110. That is, the transrecorder 120 checks whether it holds a parser corresponding to the A/V stream format, whether it holds a codec supported by the media server 110, whether it holds a transmission protocol supported by the media server 110, and whether it holds a transmission control protocol supported by the media server 110.

If the transcorder 120 does not hold any one of the resources as described above as a result of checking, it cannot perform the transcoding. Accordingly, the A/V stream request processing unit 320 of the transcorder 120 requests the resources that the A/V stream request processing unit does not hold from the media server 110 in order to perform the transcoding (S516). For example, if the transcorder 120 holds the MP4 parser and the MPEG4 codec, but does not hold the RTP protocol and the RTSP protocol, the transrecorder 120 requests an RTP library and an RTSP library.

If the transrecorder 120 requests the transmission of the resources for performing transcoding, the mobile code providing unit 220 of the media server 110 transmits the requested resources to the transrecorder 120 (S518).

Also, the transrecorder 120 requests the resources required to convert the decoded A/V stream into a format supported by the display device 130 (S520). Then, the transrecorder 120 receives the resources provided from the codec server 112 (S522).

If the transrecorder 120 holds all the resources required to receive, decode, encode, and transmit the A/V stream through the above-described process, the transrecorder reconstruction unit 330 reconstructs/reconfigures the transrecorder 120 using the format parser, codec, transmission protocol, and transmission control protocol required to receive, decode, encode, and transmit the resources held by the transrecorder reconstruction unit 330, in other words, the A/V stream (S524).

If the transrecorder 120 is reconstructed/reconfigured on the basis of the resources supported by the media server 110 and the codec server 112, the A/V stream request processing unit 320 requests transmission of the A/V stream corresponding to the content (for example, moving image) selected by the user, on the basis of the transmission control protocol that can be supported by the media server 110 (S526).

The A/V stream providing unit 240 of the media server 110 transmits the A/V stream corresponding to the content (for example, moving image) requested by the transrecorder 120, using the A/V steam format, codec, transmission protocol, and transmission control protocol, which are supported by the A/V stream providing unit 240, to the transrecorder 120 (S528). For example, the media server 110 transmits the A/V stream corresponding to the content (for example, moving image) requested by the transrecorder 120 using the MP4 format, MPEG4 codec, RTP transmission protocol, and RTSP transmission control protocol supported by the media server 110 to the transrecorder 120.

The A/V stream conversion unit 322 of the transrecorder 120 converts the A/V stream transmitted from the media server 110 into raw data by decoding the A/V stream using the codec to decode the A/V stream format transmitted from the media server 110 (S530). The decoded raw data may be temporarily stored in the buffer 326 (S532).

Then, the A/V stream conversion unit 322 of the transrecorder 120 encodes the data stored in the buffer 326 into a transport stream supported by the display device 130 using an encoding codec (S534), and transmits the encoded transport stream to the display device 130 (S536).

In addition, if the display device 130 requests storage of the A/V stream using the UI provided from the transrecorder 120, the transrecorder 120 stores the A/V stream in a storage device such as the media storage unit 304 (S538). Here, the storage device may be the mass media storage unit 304 provided inside the transrecorder 120 or an external storage device connected to the IEEE 1394 network.

Thereafter, the user can select an A/V stream which is not provided in real time from the media server 110, but is stored in the transrecorder 120, and view the selected A/V stream as desired.

If the transrecorder 120 receives the UI request from the display device 130, the UI providing unit 332 of the transrecorder 120 provides the UI in the form of a mobile code to the display device 130 (S540).

Then, if the user selects a certain A/V steam using the UI from the display device 130 and requests playback of the selected A/V stream, the transrecorder 120 reads the A/V stream from the media server 110 to provide the read A/V stream to the display device 130, or reads the A/V stream stored in the media storage unit 304 to provide the read A/V stream to the display device 130 (S542).

Accordingly, the A/V stream reception/playback unit 450 of the display device 130 decodes the A/V stream received from the transrecorder 120, and displays the decoded A/V stream through the display unit 460 (S544). Accordingly, the user can view the A/V stream of the IP network through the display device 130, such as a digital television receiver, connected to the IEEE 1394 network at the user's desired time.

As described above, in exemplary embodiments of the present invention, the A/V stream can be provided to the viewer irrespective of the format parser, codec, transmission protocol, and transmission control protocol required for the transrecorder's reception and decoding of the A/V stream from the media server, or for the transrecorder's encoding and transmission of the A/V stream to the display device. In addition, diverse A/V streams provided from the server of the data network can be stored, and then can be provided to the viewer through the display device whenever the display device connected to the IEEE 1394 network requests the A/V stream.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A system for intermediating an audio/video (A/V) stream, comprising:
   a media server for providing an A/V stream and a first mobile code for reception and decoding of the A/V stream through a data network;
   a codec server for providing a second mobile code for transmission and encoding of the A/V stream;
   a display device; and
   a transrecorder for receiving the A/V stream from the media server and for converting the A/V stream from the media server into an A/V stream of a format receivable and playable by the display device connected to the transrecorder through a network, on the basis of the first and second mobile codes from the media server and the codec server, respectively,
   wherein the media server comprises:
      an A/V stream providing unit for converting the A/V file into the A/V stream and for providing the converted A/V stream to the transrecorder if the transrecorder requests transmission of the A/V stream.

2. The system as claimed in claim 1, wherein the transrecorder transmits the A/V stream to the display device in real time.

3. The system as claimed in claim 1, wherein the transrecorder stores the A/V stream and transmits the stored A/V stream to the display device when viewing of the stored A/V stream is requested.

4. The system as claimed in claim 1, wherein the media server, the codec server, and the transrecorder are connected through an IP network, and the transrecorder and the display device are connected through the IEEE 1394 network.

5. The system as claimed in claim 1, wherein the media server comprises:
   a storage unit for storing an A/V file and the first mobile code;
   a mobile code providing unit for providing resources in the form of the first mobile code in response to a request for the resources received from the transrecorder; and
   an IP network interface unit for performing IP network communication with the transrecorder.

6. The system as claimed in claim 5, wherein the mobile code comprises at least one of a format parser, a codec, a transmission protocol, and a transmission control protocol.

7. The system as claimed in claim 5, wherein the mobile code providing unit provides at least one of a format parser, a codec, a transmission protocol, and a transmission control protocol to the transrecorder when the request to provide the resources is received from the transrecorder.

8. The system as claimed in claim 1, wherein the transrecorder comprises:
   a user interface (UI) providing unit for providing a user interface to the display device if the display device requests the user interface;
   a media storage unit for storing the A/V stream;
   an A/V stream request processing unit for providing the A/V stream, which corresponds to a request for the A/V stream received from the display device, to the display device in real time, or reading the A/V stream corresponding to the request from the media storage unit and providing the read A/V stream to the display device, if the transrecorder is reconstructed using mobile codes received from the media server and the codec server after receiving the request for the A/V stream from the display device;
   an A/V stream receiving unit for receiving the A/V stream;
   an A/V stream conversion unit for transcoding the A/V stream into the A/V stream of the format supported by the display device; and
   an A/V stream transmission unit for transmitting the transcoded A/V stream of the specified format to the display device.

9. The system as claimed in claim 8, further comprising:
   a mobile code storage unit for storing the first and second mobile codes received from the media server and the codec server; and
   a mobile code execution unit for executing the first and second mobile codes received from the media server and the codec server.

10. The system as claimed in claim 8, wherein the A/V stream request processing unit provides a list of at least one of a format parser, a codec, a transmission protocol, and a transmission control protocol supportable by the transrecorder, to the media server, receives a list of at least one of a format parser, a codec, a transmission protocol, and a transmission control protocol, which are required for reception and decoding of the A/V stream, from the media server, determines whether the A/V stream request processing unit holds the at least one of the format parser, the codec, the transmission protocol, and the transmission control protocol, and requests the at least one of the format parser, the codec, the transmission protocol, and the transmission control protocol, which is not held by the A/V stream request processing unit, from the media server.

11. The system as claimed in claim 8, wherein the A/V stream request processing unit requests resources including at least one of a format parser, a codec, a transmission protocol, and a transmission control protocol for encoding and transmitting the A/V stream to the display device, from the codec server.

12. The system as claimed in claim 8, wherein the transrecorder further comprises:
    an IEEE 1394 network interface unit for performing an interface with the display device; and
    an IP network interface unit for performing an interface with the media server and the codec server.

13. The system as claimed in claim 8, wherein the transrecorder further comprises a transrecorder reconstruction unit for reconstructing the transrecorder on the basis of resources provided by the media server and the codec server.

14. The system as claimed in claim 8, wherein the A/V stream conversion unit converts the A/V stream transmitted from the media server into raw data by decoding the A/V stream on the basis of a first codec provided by the media server, stores the raw data in a buffer, and encodes the raw data to an A/V stream of a format supported by the display device on the basis of a second codec provided from the codec server.

15. The system as claimed in claim 1, wherein the network is an IEEE 1394 network.

16. A transrecorder for receiving an audio/video (A/V) stream from a media server connected to a data network and for transmitting the received A/V stream to a display device connected to a network, the transrecorder comprising:
    a media storage unit for storing an A/V stream;
    an A/V stream request processing unit for processing a request from the display device;
    an A/V stream receiving unit for receiving the A/V stream;
    an A/V stream conversion unit for transcoding the A/V stream into an A/V stream of a format supported by the display device; and
    an A/V stream transmission unit for transmitting the transcoded A/V stream to the display device through the network,
    wherein the A/V stream is read from the media storaqe unit and transmitted to the display device if the transrecorder is reconstructed using first and second mobile codes from a media server and a codec server, respectively, after receiving the request from the display device.

17. The transrecorder as claimed in claim 16, wherein A/V stream is transmitted in real time.

18. The transrecorder as claimed in claim 16, further comprising:
    a user interface (UI) providing unit for providing a specified user interface to the display device if the display device requests the user interface;
    a mobile code storage unit for storing the first and second mobile codes received from the media server and the codec server, respectively; and
    a mobile code execution unit for executing the first and second mobile codes received from the media server and the codec server, respectively.

19. The transrecorder as claimed in claim 16, wherein the A/V stream conversion unit converts the A/V stream transmitted from the media server into raw data by decoding the A/V stream on the basis of a codec supported by the media server, stores the raw data in a buffer, and encodes the raw data to an A/V stream of a format supported by the display device, on the basis of an encoding codec provided from the codec server.

20. The transrecorder as claimed in claim 16, wherein the mobile code comprises at least one of a format parser, a codec, a transmission protocol, and a transmission control protocol.

21. The transrecorder as claimed in claim 16, further comprising:
an IEEE 1394 network interface unit for performing an interface with the display device; and
an IP network interface unit for performing an interface with the media server and the codec server.

22. The system as claimed in claim 16, wherein the network is an IEEE 1394 network.

23. A method of intermediating an audio/video (A/V) stream, the method implemented by a processor and comprising:
receiving first resources for reception and decoding of an A/V stream from a media server of a data network;
receiving second resources for encoding and transmission of the A/V stream from a codec server of the data network;
receiving the A/V stream from the media server, if transmission of the A/V stream is requested;
transcoding the A/V stream on the basis of the first and second resources received from the media server and the codec server, respectively,
wherein the A/V stream is a converted A/V stream which was converted from an A/V file by an A/V stream providing unit of the media server.

24. The method as claimed in claim 23, further comprising transmitting the transcoded A/V stream to a device connected to an IEEE 1394 network.

25. The method as claimed in claim 23, further comprising:
storing the transcoded A/V stream; and
transmitting the stored A/V stream to a device connected to an IEEE 1394 network if the device connected to the IEEE 1394 network requests the A/V stream.

26. The method as claimed in claim 23, wherein the receiving of the first resources comprises receiving the resources in a form of a mobile code.

27. The method as claimed in claim 26, wherein the mobile code form comprises at least one of a format parser, a codec, a transmission protocol, and a transmission control protocol.

28. The method as claimed in claim 23, wherein the receiving of the second resources comprises receiving the resources in a form of a mobile code.

29. The method as claimed in claim 28, wherein the mobile code form comprises at least one of a format parser, a codec, a transmission protocol, and a transmission control protocol.

30. The method as claimed in claim 23, wherein the A/V stream is reconstructed on the basis of the first resources provided from the media server and the second resources provided from the codec server.

* * * * *